United States Patent [19]

Hertel

[11] Patent Number: 5,114,482
[45] Date of Patent: May 19, 1992

[54] SKI WAX FOR USE WITH SINTERED BASE SNOW SKIS

[76] Inventor: Terry J. Hertel, P.O. Box A, Cupertino, Calif. 95015

[21] Appl. No.: 487,424

[22] Filed: Mar. 2, 1990

[51] Int. Cl.$^5$ .................. C08L 91/06; C09D 4/00; C09D 101/60
[52] U.S. Cl. .................. 106/270; 106/271; 106/10; 252/52 A; 252/54.6; 252/58
[58] Field of Search .................. 106/270, 10, 271; 252/58, 59, 52, 54.6

[56] References Cited

U.S. PATENT DOCUMENTS

| | | |
|---|---|---|
| 3,394,096 | 7/1968 | Harvey . |
| 4,366,300 | 12/1982 | Delescluse .................. 106/10 |
| 4,526,833 | 7/1985 | Burguette et al. . |
| 4,529,826 | 7/1985 | Gambaretto .................. 570/140 |
| 4,836,944 | 7/1989 | Tohzuka et al. .................. 252/58 |

OTHER PUBLICATIONS

Caporiccio, "A New Series of Lubricants for Magnetic Recording Media from Bifunctional Perfluoropolyether Derivatives"; Symposium on Memory and Advanced Recording Technologies, San Jose, Calif. (1986).
Warth, The Chemistry and Technologies of Waxes, 2nd ed., part 1, pp. 393-417 (1984).

*Primary Examiner*—William R. Dixon, Jr.
*Assistant Examiner*—Melissa Bonner
*Attorney, Agent, or Firm*—Burns, Doane, Swecker & Mathis

[57] ABSTRACT

Disclosed are methods and compositions of ski waxes for use on sintered based skis having enhanced lubricity. In particular, the ski waxes disclosed herein have incorporated a lubricity increasing effective amount of a perfluoropolyether diol and a perfluoropolyether diol compatible vehicle.

19 Claims, No Drawings

SKI WAX FOR USE WITH SINTERED BASE SNOW SKIS

BACKGROUND OF THE INVENTION

1. Field of the Invention.

The present invention is directed to ski waxes for use with sintered base snow skis. In particular, the present invention is directed to ski waxes containing a compatible vehicle and a lubricity increasing effective amount of a perfluoropolyether diol. The ski waxes disclosed herein are surprisingly effective over a very broad range of temperatures and provide the excellent lubricity for prolonged periods. Moreover, the waxes disclosed herein can be formulated as a solid or, if desired, in a convenient liquid spray.

2. State of the Art.

Sintered base snow skis are commonly employed in both competitive and recreational skiing. The sintered base skis have a polymer base, e.g., polyethylene base, and the manufacturing process for such skis involves a heat processing step to compress a polymer coupled with a skiving step which results in the formation of a thin polymer layer having pores throughout. This thin polymer is then laminated onto the base of a ski. Such sintered base skis can contain one or more of such polymers combined on the ski base in order to provide optimal performance.

Snow skis, including sintered base skis, are waxed to reduce friction and to improve control and speed and accordingly, performance. The smoother the skis run on the snow, the easier they are to control, and the more consistent the skiing will be. Accordingly, ski waxes that impart improved smoothness to the ski as it traverses the snow provide an important safety advantage especially to novice and intermediate level skiers because of the improved responsiveness of the skis. Furthermore, waxing the ski fills the porous openings in the bottom of the ski and covers imperfections in the bottom of the ski surface which may affect the skis performance.

The degree of smoothness with which a ski traverses snow is measured by the ski's lubricity. Waxes previously employed on snow skis have included a lubricity agent which, when applied with the wax to the bottom surface of the ski, increases the lubricity of the ski. One lubricity agent heretofore employed in ski waxes is a nonionic fluoroaliphatic polymeric ester commercially available under the tradename FC-740 (available from the Minnesota Mining and Manufacturing Company, Industrial Chemical Products Division, St. Paul, Minn.). When this agent is employed in a ski wax and applied to the ski surface, the lubricity of the ski is significantly increased when employed at optimal conditions, i.e., ambient temperatures of about 10° F. and less. However, at ambient temperatures of above about 10° F., the performance of waxes containing this lubricity agent, while still acceptable, is nevertheless diminished as compared to the performance at about 10° F. or less; possibility due to an decrease in lubricity with an increase in temperature.

In view of the above, there is a continuing need in competitive and recreational skiing for ski waxes having improved lubricity over those heretofore available. There is also a continuing need for ski waxes having a broad temperature range for optimal performance and ease of use.

SUMMARY OF THE INVENTION

The present invention is directed to the discovery that perfluoropolyether diols impart excellent lubricity when incorporated into a ski wax formulation. However, because perfluoropolyether diols are generally not compatible with one or more of the components typically contained in solid ski wax formulations, combinations of such components with a perfluoropolyether diol will result in separation of these components to form a two phase system. Therefore, the present invention is directed to the further discovery that at least one component is employed in the ski wax formulation as a vehicle to render the perfluoropolyether diol compatible with the formulation.

Accordingly, in one of its composition aspects, the present invention is directed to a ski wax composition for use on sintered base skis which comprises a lubricity increasing effective amount of a perfluoropolyether diol and a perfluoropolyether diol compatible vehicle.

In one of its method aspects, the present invention is directed to a method for improving the lubricity of a sintered base ski which comprises applying to the surface of said ski a ski wax composition comprising a lubricity increasing effective amount of a perfluoropolyether diol and a perfluoropolyether diol compatible vehicle.

In still another of its method aspects, the present invention is directed to a method of rendering a perfluoropolyether diol compatible with a ski wax formulation by employing at least one perfluoropolyether diol compatible vehicle.

DETAILED DESCRIPTION OF THE INVENTION

The compositions and methods of the present invention provide for ski wax compositions having excellent lubricity as well as a broader temperature range for optimal performance as compared to ski wax compositions heretofore available.

Sintered base skis for application of the ski wax compositions described herein include sintered base snow skis and boards such as boards used on snow mobiles, dog sleds and the like including sintered base skis having one or more than one polymer layer laminated onto the bottom of the ski.

One of the essential ingredients of the ski wax composition described herein is a perfluoropolyether diol. Suitable perfluoropolyether diols include any perfluoropolyether diol which is normally liquid or a solid at room temperature and which when applied to the surface of the ski increases its lubricity. Preferably, the perfluoropolyether diol is normally a liquid at room temperature (68°–85° F.); that is to say that the perfluoropolyether diol is a liquid which neither appreciably evaporates or solidifies at room temperature and ambient pressure. Preferably, the perfluoropolyether diol has a surface tension of about 20 dynes/cm$^2$ or less and more preferably a surface tension of about 14 dynes/cm$^2$ or less. Preferably, the perfluoropolyether diol has a boiling point of about 200° F. and greater. Perfluoropolyether diols having such a boiling point will not appreciably evaporate at room temperature and ambient pressure.

The perfluoropolyether diol is added to the composition in an amount sufficient to increase the lubricity of the ski wax composition. That is to say that the perfluoropolyether diol is added to the ski wax composition in an amount sufficient such that when the wax composition is applied to the ski surface, the lubricity of the surface is increased, i.e., its friction is reduced. Accordingly, any perfluoropolyether diol which, when applied to the ski surface, increases its lubricity (or decreases its friction) can be employed.

The perfluoropolyether diols include those containing —$OCF_2$—and/or —$OCF_2CF_2$—and/or —$OCF_2CF_2CF_2$—units and the like. See, for instance, Burguette et al., U.S. Pat. No. 4,526,833. The synthesis of perfluoropolyether diols is known in the art. See, for instance, Caporiccio, "A New Series of Lubricants for Magnetic Recording Media from Bifunctional Perfluoropolyether Derivatives", Symposium on Memory and Advanced Recording Technologies, San Jose, Calif. (1986). One particularly preferred perfluoropolyether diol is a perfluoropolyethylene diol commercially available from the Minnesota Mining and Manufacturing Company, Industrial Chemical Products Division, St. Paul, Minn., under the tradename FC 2202. Other perfluoropolyether diols are also commercially available. For instance, a perfluoropolyether diol containing a mixture of —$OCF_2$—and —$OCF_2CF_2$—units is available under the tradename of FOMBLIN Z DOL from Montedison, S.p.A. (Milan, Italy).

The perfluoropolyether diol is incorporated into the ski wax as a lubricity agent. Surprisingly, it has been found that ski waxes containing such perfluoropolyether diols provide excellent lubricity over a wide range of temperatures, from as low as about −20° F. (and lower) to as high as about 50° F. (and higher). That is to say that the optimal performance of the wax is not limited to a specific narrow temperature range as heretofore found with prior art ski waxes. Additionally, such ski waxes have an appreciable lifetime on the ski surface. The lifetime of the wax is the time between first waxing the skis and when the skis need to be waxed again. In fact, lifetimes up to about three days can be achieved by the use of the compositions described herein as opposed to an average lifetime of several individual runs from currently available ski waxes.

Without being limited by any theory, it is believed that the perfluoropolyether diol is particularly compatible with the polymer material employed in the sintered base skis. It is further believed that when applied to the base of the ski, the perfluoropolyether diol is incorporated onto the surface of the ski as well as into the porous openings found in the ski's base. Because of its compatibility to the polymer material employed in the sintered based skis, it is believed that the perfluoropolyether diol tightly adheres to the ski and accordingly is not readily removed during skiing. Additionally, it is believed that a portion of the perfluoropolyether diol incorporated into the pores of the skis with the initial waxing will slowly exude outward onto the surface of the ski thereby replenishing a portion of the perfluoropolyether diol lost during skiing. This suggested phenomena would explain the prolonged lifetime of the wax.

In view of the above, it is contemplated that a perfluoropolyether diol and its compatible vehicle could be incorporated into the sintered ski such as in the laminate of the ski. Alternatively, the perfluoropolyether diol can be incorporated directly into the polymer by adding the perfluoropolyether diol and its compatible vehicle to the polymer during the extrusion process. In any event, such procedures result in the incorporation of the perfluoropolyether diol into the ski which will slowly exude outward onto the surface of the ski and thereby resulting in application of these materials onto the surface of the ski.

The other essential ingredient of the ski wax compositions described herein is a perfluoropolyether diol compatible carrier (vehicle). A compatible vehicle is a compound used in the ski wax composition which permits a uniform formulation without phase separation, i.e., the perfluoropolyether diol forming a separate phase apart from the rest of the ski wax composition. That is to say that the vehicle renders the perfluoropolyether diol compatible with the other components optionally contained in the ski wax composition which in turn permits a uniform formulation without phase separation, i.e., the perfluoropolyether diol forming a separate phase apart from the rest of the ski wax composition. In general, the compatible vehicle is another fluorinated compound which is soluble (compatible) in both the perfluoropolyether diol and any other optional ski wax ingredients. Examples of suitable compatible carrier vehicles include the group of fluorinated compounds available under the tradenames of SF 2 and FC 740 (both of which are commercially available from Minnesota Mining and Manufacturing Company, Industrial Chemical Products Division, St. Paul, Minn.). The determination of other suitable compatible vehicles can be readily conducted by one of ordinary skill in the art by first determining whether a selected vehicle is compatible with the perfluoropolyether diol and, if necessary, then determining whether this combination is compatible with the entire ski wax formulation.

The ski waxes of the present invention can be formulated either as a liquid or as a solid. Because of their excellent lubricity, the present liquid ski wax formulations need only to employ a compatible vehicle in addition to the perfluoropolyether diol. In this case, the compatible vehicle is selected from the group consisting of fluorinated liquid reagents which are compatible with the perfluoropolyether diol. Suitable reagents include fluorinated liquid products available under the tradenames SF 2 and FC 740.

In a preferred embodiment, the liquid vehicle is one which has a sufficiently high vapor pressure at ambient conditions so that upon application of the liquid onto the ski base, the liquid vehicle will readily dissipate (e.g., evaporate) leaving only the perfluoropolyether diol on the ski base. Under these conditions, the vehicle, while confined in a suitable container (such as a spray bottle), will be retained primarily in a liquid form. However, when sprayed, the high vapor pressure of the liquid vehicle will allow it to rapidly evaporate under ambient conditions. A particularly suitable liquid vehicle meeting these characteristics is available under the tradename SF 2. When sprayed in the open atmosphere at room temperature (−70° F.), this liquid compound will evaporate within about 1 minute. Other such suitable liquid vehicles can be readily determined by the skilled artisan merely by determining their compatibility with perfluoropolyether diols and then measuring their boiling point so as to ensure that the such vehicles readily evaporate (generally in about 10 minutes or less, preferably in about 5 minutes or less and most preferably in about 1 minute or less at ambient conditions, e.g., about 0° F. to about 70° F.) upon application of the spray onto the base of the ski.

While liquid ski wax formulations containing only a perfluoropolyether diol and a compatible liquid vehicle provide excellent lubricity when sprayed onto the base of the ski, it is also comtemplated that additional compatible reagents can be included within these formulations. Such additional component can include, by way of example, compatible surfactants or wetting agents and the like.

When employed in a liquid formulation, the perfluoropolyether diol is employed in an amount effective to impart improved lubricity to the ski surface. In general, the perfluoropolyether diol is employed at a concentration of from about 0.1 to about 5 weight percent base on the weight of the entire formulation; preferably, at a concentration of from about 1 to about 3 weight percent base on the weight of the entire formulation; and more preferably, at a concentration of about 2 weight percent base on the weight of the entire formulation.

In such a liquid formulation, the compatible liquid carrier vehicle is generally employed in an amount from about 80 to about 99.9 weight percent based on the weight of the entire formulation; and preferably, at a concentration of from about 95 to about 99 weight percent base on the weight of the entire formulation.

When optional ingredients are contained in such a liquid formulation, such ingredients will generally comprise from about 0.1 to about 20 weight percent of the entire weight of the formulation, and preferably from about 1 to about 10 weight percent.

The liquid formulations are generally prepared by directly mixing the appropriate ingredients in the appropriate ratio by weight. The resulting formulation is then placed into either bulk containers for shipping in bulk or in commercial packaging. In either case, it is preferably that the containers/packaging be airtight, particularly in the case where the liquid carrier vehicle has a high vapor pressure.

When formulated as a solid, the ski wax compositions of the present invention contain at least one perfluoropolyether diol compatible vehicle. Because the cost of the compatible vehicle is generally much greater than that of typical paraffin wax vehicles heretofore employed in ski waxes, paraffin wax is preferably employed in combination with the compatible vehicle. When paraffin wax is employed, it is used as a covehicle. That is to say that it is an additional carrier for the perfluoropolyether diol, which is now compatible with the diol by virtue of the perfluoropolyether diol compatible vehicle. When such combinations are employed, it is only necessary to employ a sufficient amount of the compatible vehicle to render the perfluoropolyether diol compatible in the ski wax composition. One advantage of using such combinations is that because the paraffin wax is a solid and further because a large amount of compatible vehicle is not required, it is possible under these circumstances to employ a liquid compatible vehicle and still achieve a solid ski wax composition.

When employed as a solid formulation, the ski waxes of this invention contain a lubricity increasing effective amount of a perfluoropolyether diol. However, in a preferred embodiment, the perfluoropolyether diol is employed in the solid formulation at about 2 weight percent or less base on the total weight of the solid formulation. Concentrations higher than about two weight percent can in some cases result in phase separation of the perfluoropolyether diol from the solid formulation in spite the addition of the compatible carrier. Even more preferably, the perfluoropolyether diol is employed at a concentration of from about 0.1 weight percent to about 2 weight percent base on the total weight of the solid formulation.

The compatible vehicle is employed in an effective amount sufficient to render the perfluoropolyether diol compatible in the solid formulation. That is to say that with use of this effective amount, the solid formulation will remain homogenous without phase separation of the perfluoro-polyether diol. A particularly preferred liquid vehicle is a nonionic fluoroaliphatic polymeric ester available under the tradename FC-740 from Minnesota Mining and Manufacturing Company, Industrial Chemical Products Division, St. Paul, Minn. When employed, a concentration of this vehicle from about 1.5 to about 2.5 weight percent base on the weight of the total formulation is sufficient to render 2 weight percent of the preferred perfluoropolyether diol (FC 2202) compatible with the formulation. Preferably, about 2 weight percent of FC-740 based on the total weight of the formulation is employed in combination with FC 2202.

The paraffin wax can be employed in the solid ski wax compositions described herein is any paraffin wax wax compositions having a starting melting point of about 155° F. and greater. Preferably, paraffin waxes for use herein have a starting melting point of from about 155° F. to about 250° F. Paraffin waxes are described by Warth, The Chemistry and Technology of Waxes, 2d Ed., Part 1, pages 393–417 (1984). Suitable paraffin waxes are commercially available and include, by way of example, a paraffin wax having a starting melting point of about 159° F. available from Chevron Chemical Company, San Ramon, Calif., as Chevron 159, and the like.

When employed, the paraffin wax is used as a covehicle with the perfluoropolyether diol compatible vehicle and can generally be employed up to about 98 weight percent of the entire ski wax composition. Preferably, the paraffin wax is employed in an amount from about 80 weight percent up to about 98 weight percent of the entire ski wax composition; and more preferably from about 85 to about 95 weight percent of the entire ski wax composition.

The solid ski wax compositions described herein can contain optional ingredients such as a hardening agent, a surfactant, a colorant, and the like. Suitable hardening agents include known Fischer-Tropsch waxes. The preparation of such Fischer-Tropsch waxes is known in the art and described in U.S. Pat. No. 3,394,096 which is incorporated herein by reference. The hardening agent employed herein has a starting melting or congealling point of about 205° F. and greater and preferably from about 205° F. to about 250° F. When employed, the hardening agent is generally contained at between about 1 and about 20 weight percent of the ski wax composition; and preferably, between about 5 and about 10 weight percent of the ski wax composition. By way of example, a suitable hardening agent is PARA-FLINT, manufactured by Moore and Munger, Inc., West Germany and supplied under the tradename H1 by Pacific Coast Chemicals, Berkeley, Calif. This particular wax has an average molecular weight about 750 and a congealing point of 205° F. It is manufactured by the Fischer Tropsch process, i.e., low cost coal is burned in the presence of oxygen and steam to produce hydrogen and carbon monoxide, which are then polymerized to make a wide variety of hydrocarbons. The hardening agent is added to alter the density of the end product ski wax composition and thus produce a harder surface in the finished wax.

In a preferred embodiment, the solid ski wax composition disclosed herein includes a water soluble surfactant or "surface active wetting agent" in an amount up to 20% by weight. The surfactant, due to its amphiphatic properties, is added to form an aqueous transition layer between the waxed surface of the ski and the snow. This greatly reduces the force required to move the ski over the surface of the snow. The surfactant may be selected from the group consisting of an anionic, a cationic, a nonionic or a zwitterionic surface active agent.

There are numerous surfactants in each class which may be suitable for use in a ski wax in accordance with the preferred embodiment. In formulating a composition such as ski wax, a primary consideration is cost and availability. In the preferred embodiment, an anionic surfactant, sodium dodecyl sulphate, or sodium lauryl sulphate as it is also referred to, has been selected, and it gives excellent results. A particularly preferred surfactant is sodium dodecyl sulfate available under the tradename Texapon K-1296 available from Henkel Corporation, Chemical Products Division, Hoboken, N.J.

Where desired, a sufficient amount of colorant can be added to the composition to provide the desired color, e.g., red colorant to provide a red ski wax composition, etc. When a colorant is used, it is generally employed with stearic acid and the like so as to maintain the consistency of the colorant in the wax. Likewise, graphite can also be added to the wax composition so as to reduce static electricity.

The present invention will now be illustrated in greater detail by the following examples, but it is to be understood that these examples are only illustrative in nature and are not intended to limit the invention in any way.

EXAMPLES

Example 1

A liquid ski wax composition of this invention was prepared by direct mixing of the following
A. 98 Weight Percent SF 2
B. 2 Weight Percent FC 2202.

Mixing was conducted at about 70° F. to form a homogenous composition in an efficient manner so as to avoid significant evaporation of SF 2. The composition was then immediately packaged into individual 1 ounce air tight spray containers.

Example 2

A solid ski wax composition is prepared from the following:
A. 89 lb of paraffin wax (Chevron 159)
B. 6 lb of hardening agent (Paraflint)
C. 2 lb of a perfluoropolyether diol compatible vehicle (FC 740)
D. 2 lb of a perfluoropolyether diol (FC 2202)
E. 3 lb of a surfactant (Texapon K-1296).

The paraffin is heated to above its melting point at a temperature (175°-190° F.) to form a liquid with little or no dissipation of the paraffin. The hardening agent is heated to above its melting point at a temperature (about 250° F.) to form a liquid with little or no dissipation of the hardening agent. Just prior to solidification, the liquid paraffin and the liquid hardening agent are combined and then reagents C and D added. The mixture is homogenized to prevent dissipation of the lower melting point wax. While still homogenizing and as the last step before pouring, reagent E is added. Again, while still homogenizing, the composition is poured into cold molds. After solidification of the composition, the wax composition is removed from the mold to provide a solid composition of this invention.

Alternatively, the solid wax composition of this invention can be prepared from preformulated wax compositions including Racing Formula 739 ski wax, a solid wax composition commercially available from Hertel & Company, Cupertino, Calif. In this regard, such preformulations already contain Reagents A-C and E of Example 2 above at approximately the ratios cited therein. This wax is heated to above its melt temperature and homogenized. While liquid, an appropriate amount of a perfluoropolyether diol is added. Again, while still homogenizing, the composition is poured into cold molds. After solidification of the composition, the wax composition is removed from the mold to provide a solid composition of this invention.

In a preferred embodiment, the molds employed to prepare the solid wax composition are cooled before pouring the liquid composition therein. Such cooling allows for more rapid set up of the wax which in turn inhibits inhomogeneity. One means of cooling the molds is to run the molds on a circular, elipitical, etc. (continuous) conveyor belt with the pouring of the liquid composition and the off-loading of the solid composition at either ends of the belt. Both sides of the conveyor belt are cooled (e.g., via air conditioners) to an ambient air temperature of about 55°-68° F. When the liquid composition is poured, the cooled molds facilitate setting up the wax. Moreover, during the time from pouring the liquid composition to when the wax is off-loaded, the cool air permits the wax to sufficiently set so as to retain its shape after off-loading. On the other hand, during the time on the conveyor belt required to return from the off-loading point to the pouring point, the cool ambient air allows the molds to cool back down.

As is apparent, one can vary the above noted formulae by using other ingredients by simple substitution. For example, other perfluoropolyether diols which have a boiling point of about 200° F. and greater can be used in place of FC 2202. Likewise, other compatible vehicles can be used in place of either FC 740 or SF 2.

What is claimed is:

1. A liquid ski wax composition for use on sintered base skis which comprises a lubricity increasing effective amount of a perfluoropolyether diol and a liquid vehicle compatible with the perfluoropolyether diol so as to provide as a single phase system wherein said vehicle is employed from about 80 to about 99 weight percent based on the weight of the ski wax composition and further wherein the perfluoropolyether diol is employed from about 1 to about 5 weight percent based on the weight of the ski wax composition.

2. The composition as described in claim 1 wherein said perfluoropolyether diol is a liquid.

3. The composition as described in claim 2 wherein said perfluoropolyether diol has a boiling point of about 200° F. and greater.

4. The composition as described in claim 1 wherein said perfluoropolyether diol is employed from about 1 to about 3 weight percent based on the weight of the ski wax composition.

5. The composition as described in claim 4 wherein said perfluoropolyether diol is selected from the group consisting of FC 2202 and FOMBLIN Z DOL.

6. The composition as described in claim 5 wherein said perfluoropolyether diol compatible vehicle is SF 2.

7. A method for improving the lubricity of a sintered base ski which comprises applying to the surface of said ski a ski wax composition comprising a lubricity effective amount of a perfluoropolyether diol and a sufficient amount of a compatible vehicle so as to render said perfluoropolyether diol compatible in said ski wax composition.

8. A method for rendering a perfluoropolyether diol compatible with a solid ski wax composition which method comprises employing in said ski wax composition a sufficient amount of at least one compatible vehicle so as to render said perfluoropolyether diol compatible in said ski wax composition.

9. A solid ski wax composition for use on sintered base skis which comprises a lubricity increasing effective amount of a perfluoropolyether diol, a solid paraffin wax covehicle, and a sufficient amount of a vehicle compatible with the perfluoropolyether diol so as to render said diol compatible with said solid ski wax composition.

10. The composition as described in claim 9 wherein said composition comprises from about 0.1 to about 2 weight percent of said perfluoropolyether diol and from about 80 to about 98 weight percent of said solid paraffin wax covehicle.

11. The composition as described in claim 10 wherein the perfluoropolyether diol is selected from the group consisting of FC 2202 and FOMBLIN Z DOL perfluoropolyether diols.

12. The composition as described in claim 11 wherein the compatible vehicle is FC 740 nonionic fluoroaliphatic polymeric ester and further wherein said paraffin wax is a paraffin wax having a starting melting temperature above about 155° F.

13. The composition as described in claim 12 further comprising between about 1 and about 20 weight percent of a hardening agent having a starting melting temperature of about 205° F. and greater, and up to about 20 weight percent of a water soluble surfactant.

14. The composition as described in claim 13 wherein said paraffin wax is Chevron 159 wax.

15. The composition as described in claim 14 wherein said hardening agent is a Fischer-Tropsch wax.

16. The composition as described in claim 15 wherein said water soluble surfactant is sodium dodecyl sulfate.

17. The composition as described in claim 15 wherein said water soluble surfactant is Texopon K-1296 surfactant.

18. A method according to claim 7 wherein said ski wax composition is a solid.

19. A method according to claim 7 wherein said ski wax composition is a liquid.

* * * * *